United States Patent Office 3,737,307
Patented June 5, 1973

3,737,307
RECOVERY OF METALLIC NICKEL FROM SOLUTION OF CORRESPONDING SALT
Edward F. Fitzhugh, Jr., Cleveland Heights, Ohio, and Philip D. Bush and Don C. Seidel, Golden, Colo., assignors to Republic Steel Corporation, Cleveland, Ohio
Filed Dec. 1, 1971, Ser. No. 203,770
Int. Cl. C22b 23/04
U.S. Cl. 75—109
29 Claims

ABSTRACT OF THE DISCLOSURE

The process disclosed herein comprises the process of cementing or precipitating nickel from a solution containing nickel salts by the addition of iron particles under an overpressure of at least 35 p.s.i.g., preferably at least 60 p.s.i.g., and at a temperature of at least 60° and less than 100° C. The iron particles preferably have a thin coating of copper thereon. The use of overpressure permits a lower temperature to be used in the recovery process, favors more complete cementation of the nickel than without the overpressure, and results in a lower sulfur content in the cemented metal so that the product may be used directly in alloying furnaces without a prior roasting step to reduce the sulfur content.

BACKGROUND OF THE INVENTION

Field of the invention

Figure 1:
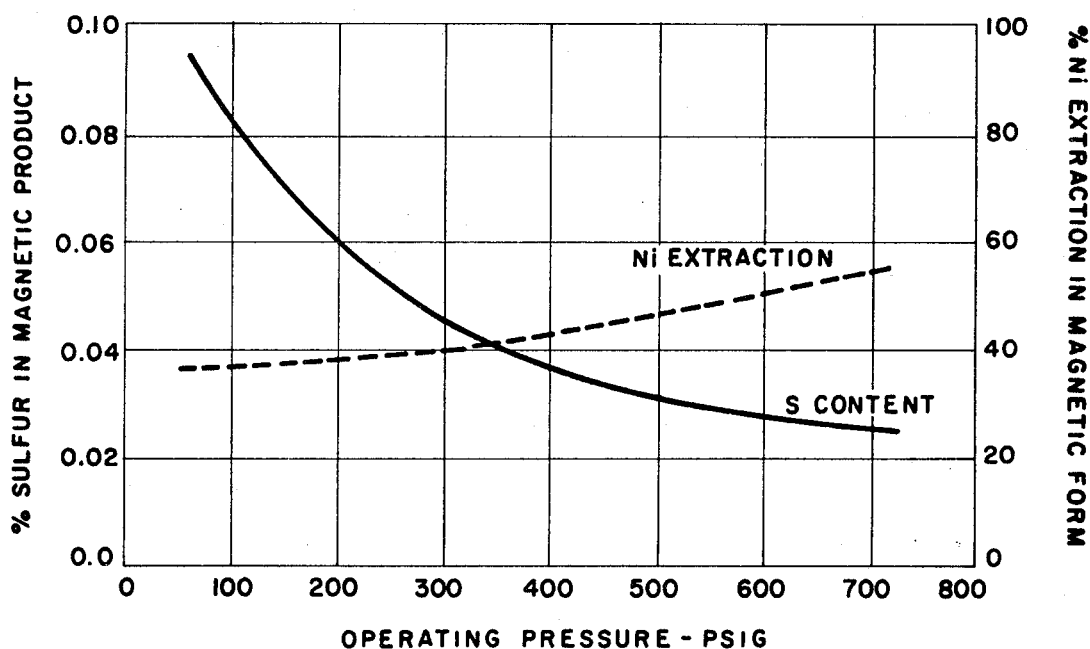

This invention relates to the recovery of nickel and/or cobalt from corresponding salt solutions. In most instances this invention relates to the process for the preferential cementation of metallic nickel from solutions containing nickel and cobalt salts. In some instances this invention relates to a process for the preferential cementation of both metallic nickel and cobalt from a solution containing both nickel and cobalt salts, and also salts of metals higher than iron in the electromotive series, such as Cr, Mg, Mn, Al, etc. More particularly, this invention relates to a process for the cementation of metallic nickel from a solution containing nickel salts by the use of superatmospheric pressure and the addition of metallic iron, preferably having a thin coating of copper thereon.

Related prior art

Because of the close similarity of properties, and the occurrence of both metals in various ores, mixtures of nickel and cobalt salts are quite common. In processes for recovering one or the other metal, the product generally contains a substantial proportion of the other metal since the properties of the two are so similar and related that chemical processing designed to recover one of the metals also extracts the other metal.

For example, various leaching processes for recovering nickel from ores containing the same, generally result in a mixture of the cobalt as well as nickel, generally in the metal salt forms. This is because the various steps of dissolving and precipitating or otherwise reacting nickel effect similar reactions with the cobalt, which is usually also present in the ore.

In view of the great demand for nickel and cobalt respectively in usable or saleable forms, practical methods of recovering the respective metals from mixtures of the two have been sought. For certain purposes for which nickel is to be used, it is undesirable to have even small amounts of cobalt present. For example, stainless steels which are to be exposed to high energy radiation should be free of cobalt because of its ability to be made radioactive.

A number of methods for recovering nickel and cobalt and for subsequently separating the two have been developed. However, those involving acidic solutions have proved to be either quite expensive or otherwise unsatisfactory for commercial operation. For example, present commercial processes involve a number of steps for the recovery of nickel from acidic solutions containing nickel and cobalt. In one case, the solutions are treated with hydrogen sulfide to recover the nickel in sulfide form. In addition to the corrosive and other undesirable characteristics of the hydrogen sulfide, it is necessary that the nickel in the sulfide is converted into metallic form. In another process, such as described in U.S. Pat. 2,805,139, hydrogen reduction is used to recover nickel in metallic form from such acid solutions. Here, however, temperatures of about 200° C. are used with pressures of over 350 p.s.i.

Various recovery processes are known for recovering the nickel from ammoniacal solution. However, starting with acid leach solutions, considerable neutralizing reagents are required with attendant expense to convert the nickel acid solution to ammoniacal solution and then to recover the metal therefrom. Also known are relatively expensive electrolytic and solvent extraction methods for separating nickel and cobalt from such mixtures.

De Merre U.S. Pat. 2,757,080 discloses a process for separating nickel from solutions containing nickel and cobalt. This process involves the separation of the nickel in the form of nickel sulfide, etc., by the addition of iron together with sulfur, arsenic, antimony, selenium or tellurium. However, subsequent processing is required to convert the nickel from the sulfide or other "ide" form to the metallic form.

Hayward U.S. Pat. 2,584,700 precipitates a number of metals simultaneously from a sulfate solution as a preliminary step in a process for preparing a pure grade of iron oxide. The purpose is to precipitate all the undesired metals from the solution, namely cobalt, nickel, chromium and aluminum, so as to leave a purified solution from which iron oxide may eventually be recovered. There is no preferential separation of nickel or cobalt or both from the other metals.

Lienhardt U.S. Pat. 1,592,307 discloses a process for precipitating nickel by the addition of metallic iron to a solution which previously had added to it a sulfate solution, preferably iron sulfate. However the nickel starting solutions are of much higher concentration and the final solution obtained by the patentee has a greater concentration of nickel than many of the solutions available commercially and with which the present invention is involved as starting solutions. Therefore Lienhardt's teachings would not be appropriate since the solutions from which nickel is to be precipitated in the practice of this invention generally already have less nickel therein than the residue solutions obtained by Lienhardt.

In other words, Lienhardt is starting with much more concentrated solutions and is not teaching a process of precipitating nickel that would be effective with the very dilute solutions that are now frequently available from commercial processing.

The Fitzhugh, Seidel and Oberg U.S. Pat. No. 3,473,920 discloses the process of precipitating nickel and/or cobalt from an acidic solution containing corresponding salts by the addition of iron powder while maintaining a temperature in the range of 100–300° C., preferably 155–180° C. This patent teaches that the use of temperatures below 100° C. gives very poor recovery of nickel. For example, FIG. 4 plots the percent recovery of nickel at various temperatures for three starting pH's. The more favorable starting pH's of 2.5 and 3.0 show a sharp rise in recoveries over 100° C. With a starting pH of 2.5 at 80° C. the recovery is about 8%; at 90° C. the recovery is about 14%; at 95° C. the recovery is about 16%; at 110° C. the recovery is about 62%; at 160° C. the recovery is about 78%; and at 180° C. the recovery is over 80%.

With a starting pH of 3.0, an even sharper rise in percent recovery is noted for temperatures above 100° C. Thus, at atmospheric pressure for 80° and 90° C., the recovery is below 10%; at about 100° C. the recovery is about 28%; and at 110° C. and autogenous steam pressure the recovery is about 95%.

Obviously, lower temperatures would be more desirable and more practical for commercial operations provided there is no sacrifice in recovery efficiency and purity of product.

STATEMENT OF THE INVENTION

In accordance with the present invention it has been found that the recovery of nickel and/or cobalt from an acidic solution containing corresponding salts can be effected at lower temperatures, namely at least 60° C. and less than 100° C., advantageously 60–95° C., preferably 75–95° C., by the use of overpressures of at least 35 p.s.i.g., preferably at least 60 p.s.i.g., preferably in the presence of 0.01–15%, preferably 0.1–1% and an optimum of about 0.2% of copper, based on the amount of iron used in such cementation. The overpressures permit the use of lower temperatures and effect a lower sulfur content in the recovered metal. The use of copper in conjunction with the iron allows a lower stoichiometric amount of iron to be used, based on the amount of nickel. At higher temperatures the stoichiometric amount of iron can be reduced. For example, at 80° C. with 11% copper the stoichiometric amount of iron is advantageously in the range of 1.5–3.0, with 0.2% copper it is 2.5–3.5.

When pressures above 100 p.s.i. are to be used the iron addition is advantageously delayed until the desired pressure is reached. It appears that the use of higher pressures, particularly hydrogen overpressure, may retard the reaction of iron with the acid and/or the escape of the hydrogen generated by such reaction, and thereby benefits the nickel recovery and the type of product precipitated.

In raising the temperature in a closed system, the pressure will obviously be increased. For example, starting with an overpressure of 35 p.s.i. at room temperature, an increase of temperature to 80° C. results in an operating pressure of about 60 p.s.i. In a typical operation, as illustrated in Example VII and elsewhere, if 70 p.s.i. pressure is used when iron is used without copper, nickel can be cemented at 80° C. in yields of 90–94%. With 0.2% Cu and a pressure of 70 p.s.i., the recovery can be 96–98%.

For most commercial purposes, 2.5% copper can be tolerated in the nickel product. Generally up to 0.75% copper is found in commercial nickel. However, where it is desired to recover Ni with less Cu, this can be effected by using less copper with the iron.

An important advantage of this invention is the cementation of nickel with very low sulfur therein. In this way the nickel can be used directly in electro-furnaces without prior removal of sulfur. For such purposes the maximum sulfur is 0.3%, generally 0.1–0.12%. Sometimes as little as 0.03–0.05% is desirable. The present process is capable of producing nickel with as little as 0.02–0.03% sulfur. Without the copper and using iron by itself to precipitate the nickel at 130° C., the nickel product has about 1–1.5% sulfur. In such cases the removal of sulfur is necessary for use of the product in electro-furnaces.

The copper is advantageously present as a discontinuous coating on the iron particles. The coating may be effected by immersing the iron powder in a solution which contains a copper salt dissolved therein.

While the inventors do not intend to be bound by any theory or explanation for the mechanism by which the copper beneficiates the nickel cementation, it is believed that the partial coating of the copper on the iron causes some galvanic activity of the iron so that the Ni is more strongly or quickly attracted to the iron and becomes cemented thereon.

While the solution of nickel salt can vary in concentration and also the solution can have various other salts therein, a typical solution duplicating proportions often found in ore leach solutions and on which the process of this invention can be practiced contains nickel, approximately $\frac{1}{20}$ as much cobalt as nickel, and varying amounts of iron, magnesium, chromium, manganese, silica and a sulfate radical. Although the recovery of nickel and cobalt can be carried out in a single step, it is preferred to do this in at least two steps so as to obtain preferential cementation of the nickel.

In the drawings, FIG. 1 shows one curve plotted for percent nickel recovered under the conditions of Example I for variations in overpressure showing increases in recovery of magnetic nickel with increase in pressure, and a second curve plotted for percent sulfur versus variations in overpressure with increase in pressure showing decreasing sulfur content.

Figure 2:
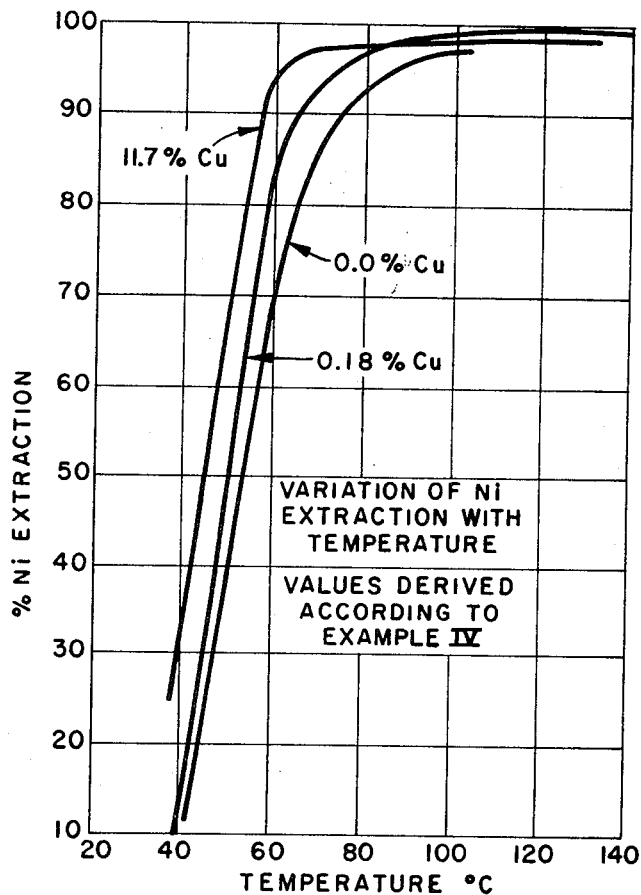

FIG. 2 shows curves plotted for percent nickel extracted according to variations in temperature with the various curves representing values obtained using iron particles, free of copper, with 0.18% copper and with 11.7% Cu. These curves illustrate graphically the improved yields using Cu with the Fe, particularly at temperatures of 60–100° C. The values are obtained according to the procedure of Example IV.

Figure 3:
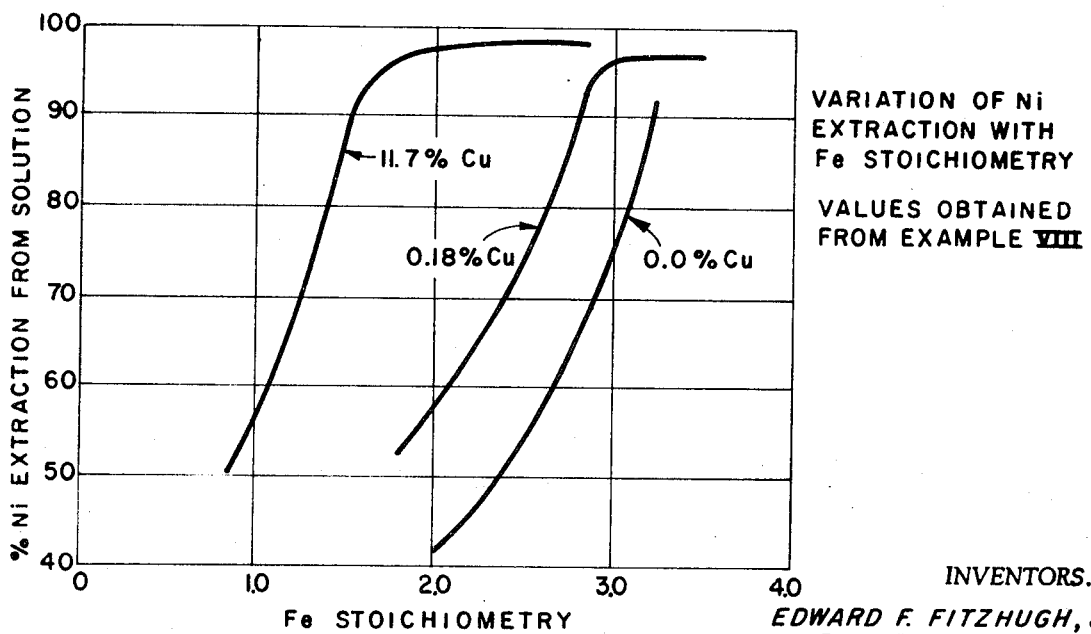

FIG. 3 has curves plotted to show that lower stoichiometric proportions of iron are required as copper is used in increasing amounts. The values are obtained according to the procedure of Example VIII.

The cementation is conducted in a closed vessel and the pressure is essentially at least 35 p.s.i.g., preferably at least 60 p.s.i.g. While there is no upper limit on the pressure, since excessive pressures have no adverse effect on the process of this invention and there is no added advantage in the use of excessive pressures, the operating pressure, for practical purposes, is advantageously 35–1000 p.s.i.g., preferably 60–700 p.s.i.g. Sufficient agitation is provided to keep the iron in suspension.

The amount of iron added is advantageously from 1 to 3 or 3.5 times the stoichiometric amount based on the amount of nickel in the starting solution. Where reference is made hereinafter to the addition of iron it is intended, unless specified otherwise, that the described amount of copper is included with the iron.

In a preferred modification of this invention for use with Ni solutions also containing Co, a two-stage procedure is used. Powdered metallic iron coated with an appropriate amount of copper is reacted in the first step with the acidic solution for about an hour at a temperature in the 80–90° C. range.

In the resultant reaction the iron displaces the nickel and a very much smaller amount of cobalt from the solution. The solids resulting from the reaction generally contain up to 50–75% nickel and an amount of cobalt equivalent to $\frac{1}{150}$ or less based on the amount of nickel present, with the remainder being undissolved iron.

After cementation and separation of the resultant Ni-Fe product, which contains very little Co, this procedure is repeated using additional Fe-Cu powder to cement more Ni with a higher percentage of Co.

It is preferred to have a lower recovery than possible in the first stage, that is 60–75% of the Ni be in a magnetic form requiring no further purification (150–200 Ni/1 Co and less than 0.05% sulfur) and the second stage cementation can be effected, with suitable pH adjustment if required, without regard to the Co and S contents using whatever means appropriate for scavenging and refining the remaning Ni and Co.

The solids may be separated from the pulp, dried and either briquetted, melted or otherwise prepared for use. They may also be used to provide the iron and copper for a subsequent cementation and thereby achieve a higher proportion of nickel to iron.

In the second stage of this preferred modification, the solution remaining from the first cementation is treated with about the same weight of iron plus copper as used before. Here, however, as the concentration of the nickel in the solution decreases, more cobalt is extracted from the solution by the cementation.

Total recoveries in the two stages are typically 98% or more of the nickel and 50–60% of the cobalt. However, the major portion of the nickel is recovered in the first cementation before appreciable amounts of cobalt are cemented in the second stage.

The process of this invention will work on solutions of a fairly large pH or acid range. In most cases, however, the pH is preferably under 5.5. Above a pH of 5.5, the addition of iron may cause formation and precipitation of increased amounts of undesirable hydroxides. Advantageously the pH range is between 1.5 and 5.5. At pH's below 1.5 an inordinate portion of iron is consumed in neutralizing the acid. While this is one means of bringing the solution into the desired pH range other means may also be used. In batch operations, the reaction has been advantageously started with a solution pH of about 2. This rises to about 3 at the end of the first cementation. Regardless of the number of cementation steps, the terminal pH is about 4–6. It is generally preferable that the amount of iron added is not more than about 3.5, preferably no more than 3 times the stoichiometric amount of iron to be used in cementing the equivalent amounts of nickel.

The particle size of the iron, even with the copper coating, has an effect in that the reaction between the iron and copper and the nickel salt solution is a surface reaction. Therefore, all other factors being equal, the reaction rate generally increases with smaller particle sizes, and the reaction goes further towards completion, because of the greater area presented. Reaction takes place even with larger particles, but at a slower rate, and is further from completion. An advantageous particle size is found to be less than 100 mesh.

In addition to the particle size, there are other characteristics such as purity and carbon content of the iron which affect the reaction rate. Low carbon iron powder is preferred for this purpose. Where there is to be preferential cementation of nickel with respect to cobalt, the iron powder is added in an amount of 0.05–3.0 times, preferably 1–2.5 time the stoichiometric quantity required to replace the nickel in solution.

The initial cement may range up to about 60% nickel with the balance being mostly iron, and with a very minute amount of cobalt equivalent generally to no more than 0.6% of the weight of nickel recovered, and very often even much less. The iron content represents undissolved iron. This cemented product is separated from the pulp. As previously indicated, this powdered solid product may be recirculated where it is desired to achieve a higher proportion of nickel to iron.

While the nickel cemented using 1.5–2.5 times the stoichiometric amount of iron based on the original nickel content of the solution gives a cement sufficiently free of cobalt for most uses, i.e., generally about 200–300 parts of nickel per part of cobalt, it is possible by using less iron in the initial cementation, for example 0.5–1 times the stoichiometric amount, to cement a smaller amount of nickel, but of a type containing even less cobalt. A number of subsequent cementations can then be performed to recover additional nickel, and eventually a substantial portion of the cobalt. Consequently, there may be a number of cementations of nickel by the stepwise addition of various proportions of iron powder with copper) with the earlier cementations giving a product containing less cobalt than in the later stages.

Conversely, substantially more of the cobalt can be cemented by using a greater amount of iron in the initial cementation. In such case, however, we have less preferential separation of the nickel from the cobalt. In such cases 3–5 times the stoichiometric amount is advantageously used.

The nickel remaining in the solution after the initially cemented nickel has been removed can be recovered by a second treatment which usually involves the addition of 1–2 times the stoichiometric amount of iron based on the amount of nickel in the original, first stage solution.

In the initial cementation, by using 1.5–2.5 times the stoichiometric amount of iron, as much as 85–95% of the nickel in the solution can be recovered as cemented metallic nickel. The recovery of nickel from the residual solution by the addition of more iron can be substantially completed in a second cementation using 1–2 times the stoichiometric amount of iron based on the nickel in the original solution. While the total cobalt recovery in the two stages is often 50–60% of the original content, these percentages will vary according to higher or lower concentration of the metal in the starting solution.

In most cases a reaction time of 30–90 minutes is sufficient for each cementation.

As indicated above a typical solution from which the above recoveries are obtained is one containing approximately 20 parts of nickel per part of cobalt, together with various proportions of iron, magnesium, manganese, chromium and silica. Since many of such nickel-cobalt solutions or mixtures are the result of leaching operations, such solutions generally have the metals in the form of sulfates or chlorides. Although reference is made to solutions containing approximately 20 parts of nickel per part of cobalt, solutions containing various other proportions of cobalt can also be treated with the process of this invention with similar preferential cementation of the nickel. While the process is more effective with solutions having higher nickel concentration, this process can be applied to solutions having as little as 0.5 gram per liter of nickel in the starting solution.

The avoidance of prolonged contact of the iron with the solution of low pressures results in a lower sulfur content in the cemented product. Therefore, where higher pressures are used, that is 100–1000 or even higher if desired, the iron is advantageously not kept in prolonged contact with the solution before the desired pressure or at least 100 p.s.i.g. is reached, or the iron addition is advantageously withheld until after at least 100 p.s.i.g. or preferably the selected operating pressure is reached. Generally a contact period of no longer than a minute may be permitted where a minimum sulfur content is desired. Where larger amounts of sulfur in the product can be tolerated, longer periods of contact can be permitted.

Although filtration and various other methods are practical for recovery of the nickel, magnetic separation is particularly advantageous and can be practiced with commercially available equipment. For such separations, it is desirable to have the nickel cemented in a form as completely magnetic as possible. Nevertheless, where the cement has nickel in both magnetic and non-magnetic forms it is possible to recover that portion of the cement which is magnetic by magnetic means of separation and any non-magnetic portion by other means, such as filtration, or it can be redissolved. The portion of nickel remaining in or redissolved in the solution can be recovered by second stage cementation.

Standard methods can be used for conducting the magnetic separation of the products of this invention. In the tests described herein in which magnetic separations are effected, a commercially available Davis tube wet magnetic separator is used. A 3-stage roughing technique with one stage of cleaning on the rougher product is used. The non-magnetic fraction is filtered and washed and various samples of the magnetically removed product, the non-magnetic tails and the tails liquor are analyzed for nickel and cobalt.

It appears that the presence of elemental sulfur in the nickel solution at the time the iron-copper is added for cementation has an effect on whether the nickel cement is magnetic or non-magnetic. If the solution contains or has a substantial amount of elemental sulfur suspended therein, or if a substantial amount of sulfur is added with the iron, the resulting cement is only partially magnetic. For example, if no more than about 0.35 of the stoichiometric amount of sulfur, based on the nickel content, is present during the cementation, the entire nickel cement is separable from the solution by magnetic means. If 0.5 or slightly more of the stoichiometric amount of sulfur is present, only a partial separation of nickel can be made by magnetic means. If substantially more sulfur is present, the nickel is precipitated in the sulfide form and there are the disadvantages of further processing to convert the nickel to the metal form as previously discussed.

Therefore, where it is desirable to recover the nickel from the pulp by magnetic means, it is desirable that there be present no more than about 0.35 times the stoichiometric amount of elemental sulfur on the basis of the nickel contained in the solution. Moreover, since higher sulfur content results in sulfur contamination of the product, it is desirable as pointed out above to have as little elemental sulfur present as possible.

As previously indicated, the ferro-nickel powder recovered from an initial cementation can be upgraded by using this powder as the source of iron for subsequent cementation. In some cases it may be desirable to coat with additional copper. For example, a ferro-nickel obtained from an initial cementation with iron-copper powder, and containing about 33% nickel is used in cementing nickel from a second solution. The cement from the second solution contains about 41% nickel.

The process of this invention can be operated either continuously or batchwise.

There are instances in which it is desirable to recover metallic nickel from solutions containing nickel salt but no cobalt. This invention can likewise be used to cement metallic nickel therefrom in the same manner as described above.

Again, it may be desirable to recover cobalt from solutions containing a cobalt salt, but no nickel. This invention can then be used to cement metallic cobalt in the manner described above.

GENERAL CEMENTATION PROCEDURE

The nickel cementation experiments described herein are performed in a 2-liter autoclave reactor made of 316 stainless steel and having a double impeller. The reactor is a standard one commercially available as Parr 2-L Reactor 316SS. The recovery of the cement is facilitated by using a glass liner, but the reaction solution can be directly in contact with the stainless steel.

Into this 2-liter autoclave there is placed one liter of an aqueous acidic solution containing the nickel salt, from which the metallic nickel is to be recovered, together with whatever other metal impurities may be present. The solution is adjusted to the desired pH and then an appropriate amount of finely divided low carbon iron is added, with or without the copper as indicated. The autoclave is closed and with sufficient agitation to keep the iron powder in suspension, the reactor is purged with hydrogen to remove the oxidizing atmosphere. If a hydrogen overpressure is desired, it may be initiated at the time of purging or introduced at any desired time. The temperature is raised to and maintained at 80° C. or other appropriate temperature for the reaction.

When pressures above 100 p.s.i., and sometimes even when as low as 80 p.s.i. are used, the addition of the iron is advantageously delayed until after the desired pressure is reached. This can be effected by having the iron in a small container or cup, or in a separate feed line, and thereby held out of the nickel salt solution and, at the appropriate time, the container or cup is tilted, or a valve opened in the separate feed line to allow the iron powder to run into the solution. Agitation is provided to keep the iron powder suspended. In a continuous system the iron powder may be introduced into the system in the solution feed stream.

As indicated, the iron powder is generally coated with an appropriate amount of copper to effect the improvement of this invention. The resultant cement is recovered by magnetic separation or by filtration to give a ferro-nickel powder. Where cobalt is also present in the solution, the powder has a cobalt content. After the cementation the pH is generally about 5–6. The other metals either remain in the solution or appear in the nonmetallic solids.

Various methods of practicing the invention are illustrated by the following examples. These examples are intended merely to illustrate the invention and not in any sense to limit the manner in which the invention can be practiced. The parts and percentages recited therein and all through the specification, unless specifically provided otherwise, are by weight.

EXAMPLE I

The above-described procedure is used in a number of runs except that a 5-gallon reactor similarly equipped is used and this has a feed line in which iron powder is stored until the appropriate time for addition at which time the iron is allowed to run into the reactor by turning a valve in this feed line. Leach pulps from laterites are used having an initial pH of 2.0 and containing the nickel and other salts normally present, the Ni content being shown in the table below. In each case the temperature and pressure are reached before the iron is added and the temperature and pressure maintained throughout the run. Then the product is recovered magnetically and analyzed for percent Ni and S. In each case the temperature is 80° C. and the reaction time is 75 minutes. The operating pressures and the results are shown below in Table I and are also plotted in FIG. 1.

TABLE I

| Iron | | Ni in solution, g./l. | Operating pressure, p.s.i.g. | Ni recovered as magnetic product, percent | Percent S in magnetic product |
|---|---|---|---|---|---|
| Percent Cu | Stoich. | | | | |
| 0.0 | 3.2 | 4.35 | 60 | 35.0 | 0.09 |
| 0.0 | 3.2 | 4.35 | 100 | 43.6 | 0.09 |
| 0.0 | 3.2 | 4.35 | 200 | 39.8 | 0.06 |
| 0.0 | 3.2 | 4.72 | 400 | 42.6 | 0.02 |
| 0.0 | 3.2 | 4.72 | 600 | 51.6 | 0.03 |

EXAMPLE II

The above described procedure is used in a typical leach solution which has been clarified by filtration and contains per liter of solution:

|  | Grams |
|---|---|
| Ni | 2 |
| Co | 0.1 |
| Fe | 0.25 |
| Mg | 11.0 |
| Cr | 0.01 |
| Mn | 0.25 |
| Si | 0.1 |
| $SO_4$ | 52.0 |

A starting pH of 1.6 is used with three stoichiometric equivalents of iron based on the amount of Ni with the iron coated with 0.2% Cu by first treating the finely divided iron for 15 minutes with a copper sulfate solution containing the desired amount of copper as copper sulfate. Using hydrogen overpressure of 60 p.s.i.g., a temperature of 80° C. and a reaction period of 75 minutes a recovery of 80–98% nickel is obtained with the precipitated product containing about 40–45% nickel and about 0.5% cobalt. The other metals remain in solution.

EXAMPLE III

Two solutions are made to test the effect of the presence of other metal salts in solutions from which Ni is to be precipitated. Solution (A) contains 10.1 grams of Ni as nickel sulfate and Solution (B) contains a number of salts with the amounts of the respective metals in grams per liter reported as follows:

| | |
|---|---|
| Ni | 10.9 |
| Co | 0.15 |
| Fe | 0.38 |
| Mg | 16.0 |
| Mn | 0.12 |
| Cr | 0.001 |

Tests are performed with two solutions using identical conditions of 1.6 starting pH, 3.2 iron stoichiometry, 80° C. operating temperature, and 75 minutes at operating temperature with the following results:

| Solution | Percent Cu with Fe | Hydrogen overpressure Initial, p.s.i.g. | Hydrogen overpressure Operating, p.s.i.g. | Percent S in magnetic product | Percent Ni to magnetic product |
|---|---|---|---|---|---|
| A | 0.0 | 35 | 50 | 0.04 | 93.7 |
| B | 0.0 | 35 | 60 | 0.02 | 92.7 |
| A | 0.18 | 35 | 50 | 0.05 | 95.1 |
| B | 0.18 | 35 | 60 | 0.04 | 94.7 |

As will be noted, the results in percent Ni to magnetic product is practically the same, varying only to 0.4% when Cu is used and by 1% when no Cu is used. Therefore a number of the subsequent examples are performed on solutions containing Ni as the only metal on the assumption that the results will be quite similar to such a solution also containing the other metals indicated.

EXAMPLE IV

A series of experiments is performed according to the procedure described in Example II using instead of the leach solution a synthetic solution containing 10 grams of nickel in the form of sulfate as the only salt in the solution. The following identical conditions are used in each experiment, but the temperature and amount of Cu are varied as noted below in Table II. The curves in FIG. 2 are drawn from these values and show the effect of the presence of Cu in reducing the temperature necessary to produce an equivalent Ni recovery.

TABLE II

| Temp., ° C. | Percent Cu | Final pH | Distribution of Ni (percent) Magn. | Distribution of Ni (percent) Non-magn. | Distribution of Ni (percent) Filtrate | Percent S* | Operating pressure, p.s.i.g. |
|---|---|---|---|---|---|---|---|
| 135 | 0.0 | 6.4 | 98.8 | 0.1 | 1.1 | 1.02 | 90 |
| 110 | 0.0 | 7.25 | 98.0 | 0.0 | 1.9 | 0.84 | 80 |
| 80 | 0.0 | 5.7 | 93.7 | 0.1 | 6.2 | 0.04 | 70 |
| 60 | 0.0 | 6.25 | 76.0 | 0.1 | 23.9 | 0.03 | 60 |
| 40 | 0.0 | 6.4 | 10.3 | 0.2 | 89.0 | 0.02 | 55 |
| 135 | 0.18 | 6.6 | 98.9 | 0.1 | 1.0 | 0.95 | 120 |
| 110 | 0.18 | 7.2 | 98.9 | 0.0 | 1.1 | 0.56 | 80 |
| 80 | 0.18 | 7.0 | 96.6 | 0.1 | 3.3 | 0.10 | 70 |
| 60 | 0.18 | 6.35 | 84.6 | 0.1 | 15.3 | 0.02 | 60 |
| 60 | 0.18 | 6.6 | 11.5 | 0.2 | 88.3 | 0.02 | 45 |
| 135 | 0.26 | 6.9 | 99.0 | 0.1 | 0.9 | | 105 |
| 110 | 0.26 | 7.2 | 97.4 | 0.1 | 2.5 | | 80 |
| 80 | 0.26 | 6.8 | 95.9 | 0.0 | 4.1 | | 55 |
| 60 | 0.26 | 6.15 | 86.3 | 0.1 | 13.6 | | 55 |
| 40 | 0.26 | 6.2 | 17.1 | 0.5 | 82.4 | | 45 |
| 135 | 11.7 | 6.9 | 98.0 | 0.5 | 1.5 | 1.74 | 95 |
| 110 | 11.7 | 7.25 | 97.9 | 0.0 | 2.1 | 0.56 | 80 |
| 80 | 11.7 | 7.0 | 95.5 | 0.5 | 4.0 | 0.04 | 50 |
| 60 | 11.7 | 6.7 | 97.2 | 0.2 | 2.6 | 0.02 | 40 |
| 40 | 11.7 | 6.2 | 36.0 | 0.2 | 63.8 | 0.06 | 40 |

* In magnetic product.

| | |
|---|---|
| Feed solution, gms. Ni per liter of solution | 10 |
| Time of reaction, minutes | 75 |
| Initial pressure (hydrogen), p.s.i.g. | 35 |
| Initial pH | 1.6 |

EXAMPLE V

The procedure of Example IV is repeated with the variations and results noted below:

| | |
|---|---|
| Feed solution, gms. Ni per liter of solution | 10 |
| Reaction temperature, ° C. | 80 |
| Initial pressure (hydrogen), p.s.i.g. | 35 |
| Initial pH | 1.6 |

| Time, min. | Percent Cu | Final pH | Distribution of Ni (percent) Magn. | Distribution of Ni (percent) Non-magn. | Distribution of Ni (percent) Filtrate | Percent S | Oper. pressure, p.s.i.g. |
|---|---|---|---|---|---|---|---|
| 75 | 0.0 | 5.7 | 93.7 | 0.1 | 6.2 | 0.09 | 70 |
| 30 | 0.0 | 5.5 | 68.6 | 0.1 | 31.3 | 0.03 | 60 |
| 15 | 0.0 | 5.55 | 66.8 | 0.1 | 33.1 | 0.02 | 80 |
| 1 | 0.0 | 5.6 | 55.6 | 0.1 | 44.3 | 0.05 | 80 |
| 75 | 0.18 | 7.0 | 96.6 | 0.1 | 3.3 | 0.01 | 70 |
| 30 | 0.18 | 6.5 | 92.2 | 0.2 | 7.6 | | 60 |
| 15 | 0.18 | 5.8 | 80.2 | 0.2 | 19.6 | | 80 |
| 1 | 0.18 | 5.75 | 66.0 | 0.1 | 33.9 | | 80 |
| 75 | 11.7 | 7.0 | 95.5 | 0.5 | 4.0 | 0.04 | 50 |
| 30 | 11.7 | 7.1 | 96.0 | 0.4 | 3.6 | | 50 |
| 15 | 11.7 | 6.3 | 96.0 | 0.2 | 3.8 | | 60 |
| 1 | 11.7 | 6.2 | 90.0 | 0.2 | 9.8 | | 55 |

EXAMPLE VI

The procedure of Example IV is used with the following variations and results:

| | |
|---|---|
| Feed solution, gms. Ni per liter of solution | 10 |
| Reaction temperature, ° C. | 80 |
| Reaction time, minutes | 75 |
| Initial pH | 1.6 |

| Initial pressure, p.s.i.g. | Percent Cu | Final pH | Distribution of Ni (percent) | | | Percent S | Oper. pressure, p.s.i.g. |
|---|---|---|---|---|---|---|---|
| | | | Magn. | Non-Magn. | Filtrate | | |
| 35 | 0.0 | 5.7 | 93.7 | 0.1 | 6.2 | 0.04 | 70 |
| 60 | 0.0 | 5.9 | 92.7 | 0.2 | 7.1 | 0.02 | 80 |
| 100 | 0.0 | 5.6 | 83.1 | 0.1 | 16.8 | | 140 |
| 35 | 0.18 | 7.0 | 96.6 | 0.1 | 3.3 | 0.01 | 70 |
| 60 | 0.18 | 6.8 | 97.6 | 0.3 | 2.1 | | 85 |
| 100 | 0.18 | 5.85 | 87.9 | 0.2 | 11.9 | | 130 |

EXAMPLE VII

The procedure of Example IV is repeated with the variations and results noted below:

Feed solution, gms. Ni per liter of solution _____ 10
Reaction temperature, ° C. _____ 60
Reaction time, minutes _____ 75
Initial pH _____ 1.6

| Initial pressure, p.s.i.g. | Percent Cu | Final pH | Distribution of Ni (percent) | | | Percent S | Oper. pressure, p.s.i.g. |
|---|---|---|---|---|---|---|---|
| | | | Magn. | Non-Magn. | Filtrate | | |
| 35 | 0.0 | 6.25 | 76.0 | 0.1 | 23.9 | 0.03 | 60 |
| 60 | 0.0 | 5.89 | 68.2 | 0.1 | 31.7 | | 90 |
| 100 | 0.0 | 5.3 | 41.7 | 0.3 | 58.0 | | 110 |
| 35 | 0.18 | 6.35 | 84.6 | 0.1 | 15.3 | 0.02 | 60 |
| 60 | 0.18 | 6.2 | 88.6 | 0.1 | 11.3 | | 75 |
| 100 | 0.18 | 5.95 | 66.2 | 0.2 | 33.6 | | 110 |

EXAMPLE VIII

A series of experiments is performed according to the procedure described in Example II using instead of the leach solution a synthetic solution containing 10 gms. of nickel in the form of sulfate as the only salt in the solution. The following identical conditions are used in each experiment:

Feed solution, gms. Ni per liter of solution _____ 10
Reaction time, minutes _____ 75
Temperature, ° C. _____ 80
Initial pressure, p.s.i.g. _____ 35
Initial pH _____ 1.6

The amounts of copper and iron are varied as indicated in the table below. The curves in FIG. 3 are drawn from these values and show the effect of the presence of copper in reducing the number of stoichiometric amounts of iron necessary to produce an equivalent nickel recovery.

| Percent Cu | Stoich. Fe* | Final pH | Distribution of Ni percent | | | Operating pressure, p.s.i.g. |
|---|---|---|---|---|---|---|
| | | | Magn. | Non-magn. | Filtrate | |
| 0.0 | 3.2 | 5.7 | 93.7 | 0.1 | 6.2 | 70 |
| 0.0 | 2.5 | 4.6 | 54.2 | 0.0 | 45.8 | 60 |
| 0.0 | 2.0 | 5.1 | 41.5 | 0.3 | 58.2 | 60 |
| 0.18 | 3.5 | 6.8 | 96.2 | 0.2 | 3.6 | 60 |
| 0.18 | 3.0 | 6.7 | 96.3 | 0.1 | 3.6 | 60 |
| 0.18 | 2.5 | 5.1 | 72.7 | 0.1 | 27.2 | 60 |
| 0.18 | 2.0 | 5.1 | 57.4 | 0.1 | 42.5 | 60 |
| 11.7 | 3.5 | 7.0 | 97.8 | 0.2 | 2.0 | 50 |
| 11.7 | 3.2 | 7.0 | 95.5 | 0.5 | 4.0 | 55 |
| 11.7 | 2.0 | 6.3 | 96.7 | 0.4 | 2.9 | 55 |
| 11.7 | 1.5 | 5.55 | 88.1 | 0.1 | 11.8 | 55 |
| 11.7 | 1.0 | 4.5 | 56.3 | 0.1 | 43.6 | 55 |

*Stoichiometric amounts of Fe based on amount of Ni.

EXAMPLE IX

The procedure of Example II is repeated using a solution containing per liter solution the following:

Grams
Co _____ 2
Fe _____ 0.25
Mg _____ 11.0
Cr _____ 0.01
Mn _____ 0.25
Si _____ 0.1
SO₄ _____ 52.0

Using the concentrations and conditions of Example I, a precipitate is obtained representing 86.8 percent of the cobalt and analyzing 25.7 percent cobalt. The other metals remain in solution.

EXAMPLE X

The procedure of Example I is repeated twice using 0.15% Cu based on the weight of iron and in one case operating at a hydrogen overpressure of 45 p.s.i.g. with the iron added at hte beginning and in the other case at 600 p.s.i.g. with the iron added after operating pressure is achieved. The results are as follows:

| | | |
|---|---|---|
| Operating pressure (p.s.i.g.) | 45 | 600 |
| Ni in solution (g./l.) | 4.42 | 4.74 |
| Percent copper on Fe | 0.15 | 0.15 |
| Percent Ni recovered as magnetic product | 42.3 | 70.9 |
| Percent S in magnetic product | 0.09 | 0.04 |

EXAMPLE XI

The cementation of Ni is carried out on a continuous basis using the following operating conditions:

Temperature, ° C. _____ 80
Time, minutes _____ 75
Iron stoichiometry _____ 3.2
Operating pressure, p.s.i.g. _____ 600
Initial pH _____ 2.0

A leach pulp containing 4.7 g./liter Ni in solution is pumped into a pressurized system consisting of five Autoclave Engineers' stirred-pressure vessels. Each of the vessels has a total capacity of 5 gallons and is constructed of 316 Stainless Steel. They are in open circuit in line to minimize short-circuiting of the pulp. The flow of pulp from one vessel to the next is by gravity overflow. The flow rate through the system is such that the residence time of pulp in the system is 75 minutes. The powdered iron addition is made to the first vessel. The product pulp is removed from the fifth vessel and passed through a wet drum magnetic separator to recover the magnetic nickel-bearing product. The results of tests carried out in this manner are given below.

| Iron addition | | Percent Ni recovery (solution to magnetic product) | Magnetic product | |
|---|---|---|---|---|
| Percent Cu | Stoichiometry | | Ni percent | S percent |
| 0.0 | 3.2 | 50-55 | 20-25 | 0.03 |
| 0.15 | 3.2 | 60-65 | 25-30 | 0.04 |

EXAMPLE XII

The procedure of Example XI is repeated using a leach pulp having 4.2 g./liter Co in solution. Using the operating conditions of Example XI with iron powder not having a copper coating, 50 to 55% of the cobalt is recovered as a magnetic cementation product analyzing 20 to 25% Co.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. The process of recovering metallic nickel from an aqueous solution containing a nickel salt comprising the steps of:
   (a) subjecting said solution to a pressure in the range of at least 35 p.s.i.g.;
   (b) adding iron powder thereto prior to or after said pressure is applied;
   (c) maintaining at least said pressure and a temperature of at least 60° C. and less than 100° C.;
   (d) continuing the resultant reaction until a substantial amount of metallic nickel has been cemented from said solution; and
   (e) thereafter separating said cemented nickel from said solution.

2. The process of claim 1 in which said pressure is applied by introducing pressurized hydrogen.

3. The process of claim 2 in which said pressure is at least 60 p.s.i.g.

4. The process of claim 3 in which said temperature is in the range of 75–95° C.

5. The process of claim 4 in which said iron has occluded thereto 0.01–15 percent by weight of metallic copper depending on the weight of said iron.

6. The process of claim 5 in which said iron has occluded thereto 0.1–1 percent by weight of metallic copper based on the weight of said iron.

7. The process of claim 1 in which said temperature is in the range of 75–95° C.

8. The process of claim 7 in which said pressure is in the range of 100–1000 p.s.i.g.

9. The process of claim 8 in which said iron is added after a pressure of at least 100 p.s.i.g. has been applied.

10. The presence of claim 8 in which said iron has occluded thereto 0.1–1 percent of metallic copper based on the weight of said iron.

11. The process of claim 1 in which said solution also contains at least one metal higher than iron in the electromotive series.

12. The process of claim 1 in which said solution also contains a salt of cobalt.

13. The process of claim 12 in which, after separation of the initially cemented nickel, a second addition of iron is performed to produce cemented metal containing a higher proportion of cobalt than in the initial cemented product.

14. The process of claim 1 in which the amount of iron added is at least 0.05 times the equivalent weight of nickel present in the solution.

15. The process of claim 1 in which the amount of iron added is 1–3.5 times the equivalent weight of nickel contained in the solution.

16. The process of claim 1 in which said salts are sulfate salts.

17. The process of claim 1 in which said salts are the chloride salts.

18. The process of claim 1 in which said solution has a pH no greater than 5.5.

19. The process of claim 1 in which said iron powder is a ferro-nickel powder obtained by a previous addition of iron powder to an acidic solution of a nickel salt.

20. The process of claim 1 in which said cemented product is separated from said solution and additional nickel is cemented by the further addition of finely divided metallic iron to the remaining solution.

21. A continuous process for recovering metallic nickel from an aqueous solution containing a nickel salt comprising the steps of:
   (a) subjecting said solution to a pressure in the range of at least 35 p.s.i.g. and a temperature of 60–95° C.;
   (b) continually adding iron powder thereto;
   (c) continually adding to said solution a feed stream of similar composition having a pressure and temperature which will not substantially alter the aforesaid pressure and temperature; and
   (d) continually withdrawing from said solution at a point remote from the point of entry of said feed stream and from the point of entry of said iron powder a portion of said solution and at least a portion of the metal cemented from said solution.

22. The process of claim 21 in which said solution also contains a cobalt salt.

23. The process of claim 22 in which the cemented metal is substantially completely removed from said solution and a second addition of iron is performed to produce a second cementation of metal which contains a higher proportion of cobalt than in the original cementation.

24. The continuous process of claim 21 in which said iron powder is added in said feed stream.

25. The continuous process of claim 21 in which the pressure and temperature of said stream are substantially those of said solution.

26. The continuous process of claim 21 in which a portion of said withdrawn solution is recycled to the main body or stream of said solution after cemented nickel is separated therefrom.

27. The process of recovering metallic cobalt from an aqueous solution containing a cobalt salt and substantially no nickel comprising the steps of:
   (a) adding to said cobalt salt solution iron powder having occluded thereto 0.01–15 percent by weight of metallic copper based on the weight of iron powder;
   (b) maintaining a temperature in the range of 60–95° C. and a pressure of at least 35 p.s.i.g.;
   (c) continuing the resultant reaction until a substantial amount of metallic cobalt has been cemented from said solution; and
   (d) thereafter separating said cemented cobalt from said solution.

28. A continuous process for recovering metallic cobalt from an aqueous solution containing a cobalt salt and substantially no nickel comprising the steps of:
   (a) subjecting said solution to a pressure in the range of at least 35 p.s.i.g. and a temperature of 60–95° C.;
   (d) continually adding iron powder thereto;
   (c) continually adding to said solution a feed stream of similar composition having a pressure and temperature which will not substantially alter the aforesaid pressure and temperature; and
   (d) continually withdrawing from said solution at a point remote from the point of entry of said feed stream and from the point of entry of said iron powder a portion of said solution and at least a portion of the metal cemented from said solution.

29. The process of recovering at least on metal selected from the class consisting of nickel and cobalt from an aqueous solution containing a salt of said metal comprising the steps of:
   (a) subjecting said solution to a pressure in the range of at least 35 p.s.i.g.;
   (b) adding iron powder thereto prior to or after said pressure is applied;
   (c) maintaining at least said pressure and a temperature of at least 60° C. and less than 100° C.;
   (d) continuing the resultant reaction until a substantial amount of said metal has been cemented from said solution; and (e) thereafter separating said cemented metal from said solution.

References Cited

UNITED STATES PATENTS

| | | | |
|---|---|---|---|
| 1,592,307 | 7/1926 | Lunhardt | 75—119 |
| 2,068,296 | 1/1937 | Lausberg | 75—109 |
| 2,740,708 | 4/1956 | Papee | 75—109 X |
| 3,288,598 | 11/1966 | Hogue | 75—109 |
| 3,473,920 | 10/1969 | Fitzhugh et al. | 75—109 |

HERBERT T. CARTER, Primary Examiner

U.S. Cl. X.R.

75—119